Nov. 30, 1926.
H. C. METZGAR
1,609,266
METHOD AND APPARATUS FOR TREATING SHEET GLASS
Filed Dec. 23, 1925
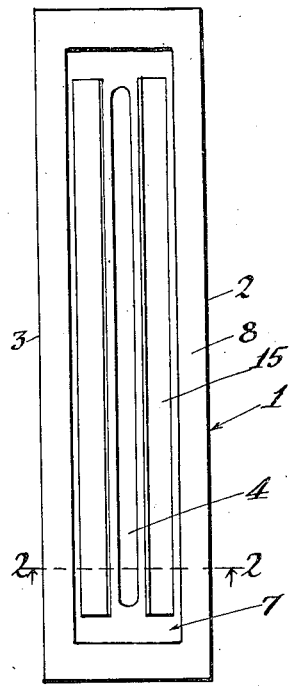
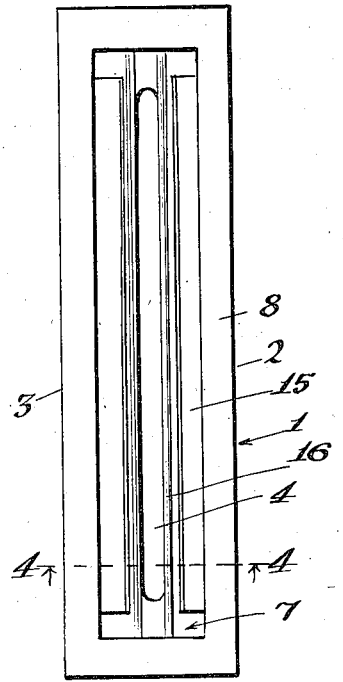
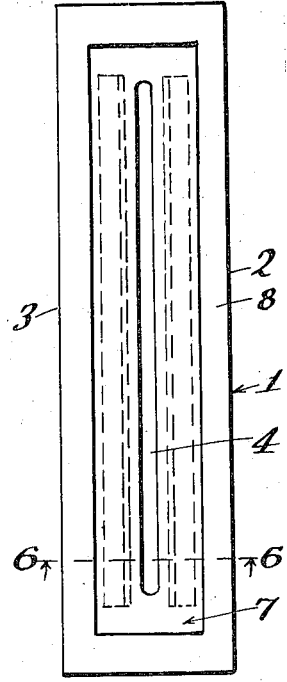
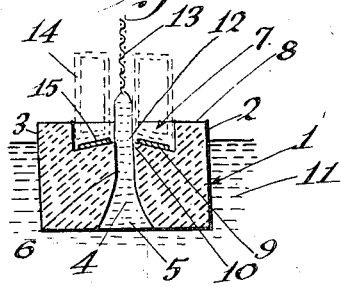
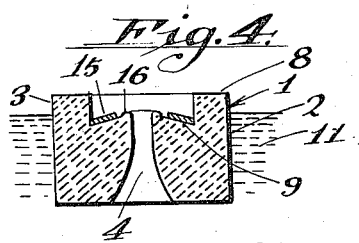
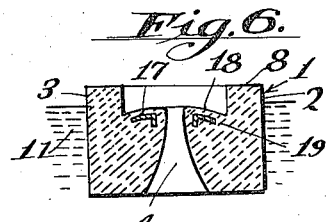
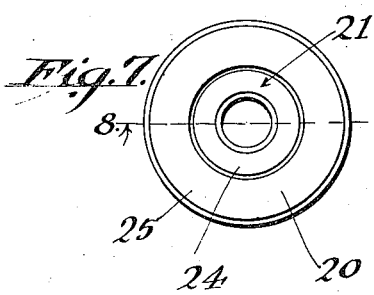
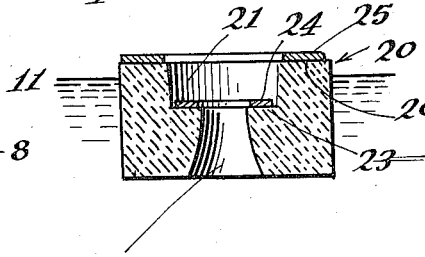
Inventor:
H. C. Metzgar Patented Nov. 30, 1926.

1,609,266

UNITED STATES PATENT OFFICE.

HAROLD C. METZGAR, OF TORRANCE, CALIFORNIA, ASSIGNOR OF ONE-HALF TO JOSEPH BERMAN, OF TORRANCE, CALIFORNIA.

METHOD AND APPARATUS FOR TREATING SHEET GLASS.

Application filed December 23, 1925. Serial No. 77,218.

My invention is particularly directed to a method of treating sheet glass and the apparatus therefor, but may be utilized generally in the manufacture of drawn glass.

My method and apparatus apply particularly to the processes and appliances for making drawn sheet glass by the Fourcault or similar processes, in which the molten glass is drawn through or past refractory material.

An object of my invention is to eliminate the waves or streaks or other irregularities in the surface of the drawn glass.

A more specific object of my invention is to eliminate or reduce the conduction or radiation of heat from the refractory material adjacent which the glass is drawn so that this material, the thin layer of glass adjacent thereto and the molten glass being drawn will not have such differences of temperature to cause these streaks or waves.

A further specific object of my invention is to apply a covering or coating of heat insulating material on the refractory body adjacent which the glass is drawn or to incorporate a heat insulating composition therein so as to reduce the conduction of heat by the refractory body and also to reduce the radiation of heat therefrom. My invention also comprehends the apparatus in the form of refractory bodies against or adjacent which the molten glass is drawn, having a heat insulating or retarding medium incorporated therein or covering part or all of the refractory bodies.

In the formation of a glass sheet drawn continuously, the molten glass (designated in the trade as molten metal) passes through or alongside of a body of refractory material. The loss of heat by conduction and radiation through the refractory body sets up a colder condition in the molten glass adjacent to or alongside of the refractory body. The difference in temperature between the molten glass adjacent to or alongside the refractory body and the molten glass passing between the refractory material in being drawn causes a tension or drag between the colder and the hotter parts of the molten glass. This results in streaks, waves or lines or other imperfections in the surface of the glass being drawn. Such imperfections are commonly formed in sheet glass, also in rods, tubes or other types of similar drawn glass.

In some applications of my method I employ a heat insulating body or a material which is a poor or a non-conductor of heat, incorporated in or covering part or all of the refractory body or material utilized in connection with the glass drawing. This reduces the loss of heat by conduction and radiation through the refractory body and materially decreases the difference of temperature between the glass immediately adjacent or alongside the refractory body and the glass under the drawing operation passing between or adjacent the refractory body. With my construction I am enabled to reduce the loss of or transference of heat to such an extent that the streaks and waves are practically eliminated.

My invention as to the method and appliances will be more readily understood from the following description and drawings, in which;

Fig. 1 is a plan view of an apparatus for drawing sheet glass, illustrating the application of my insulating covering thereto.

Fig. 2 is a vertical section through Fig. 1 on the line 2—2, indicating a type of structure forming the so-called drawing block.

Fig. 3 is a plan view of a modification of the drawing block.

Fig. 4 is a cross section of Fig. 3, on the line 4—4.

Fig. 5 is a plan showing a further modification.

Fig. 6 is a transverse section of Fig. 5, on the line 6—6, indicating the heat insulating material incorporated in the drawing block structure.

Fig. 7 is a plan of a drawing block for drawing rods.

Fig. 8 is a vertical section through Fig. 7, on the line 8—8.

Referring particularly to Figs. 1 and 2, in the Fourcault processes of drawing sheet glass and in other somewhat similar processes, a drawing block is used designated generally by the numeral 1. This block is made of refractory material in order to withstand the high temperature of the molten glass and also to provide a material which has rather poor heat conducting properties. For the purpose of my invention, different forms of these drawing blocks are illustrated but it is to be understood that I am not restricted either in my method or appliance to any definite type of drawing block or other particular shape or make of refractory material against or adjacent which the glass is drawn.

The drawing block 1 usually has similar opposite sides 2 and 3 with a passage 4 therethrough. This passage has a flared or belled mouth at the lower surface and usually has parallel side walls 6 in the upper part of the passage. The top of the drawing block has a recess 7 leaving upstanding outside rims 8 on the opposite sides 2 and 3 of the drawing block. The surface 9 of the recess is usually sloped towards the outside with the upper corner 10 of the passage on the bottom of the recess forming an angle slightly less than a right angle.

In the usual processes of drawing glass, the drawing block is immersed, that is pressed downwardly in any suitable manner into a pot or furnace of molten glass until the level of the glass 11 is slightly higher than the discharge orifice 12 of the passage. Therefore the molten glass is forced in the mouth 5 and up the passage 4. A metal strip, usually of open mesh fabric 13 and called the bait is dipped into the glass as it passes upward through the orifice and forms a means for drawing a sheet of glass upwardly. It is usually the practice to have cooling chambers 14, shown dotted, on each side of the sheet above the recess formed of water pipes to chill the glass and solidify it as soon as it passes above the orifice of the drawing block.

In this procedure the drawing block, although made of refractory material, conducts and radiates considerable heat and although immersed in a bath of molten glass, considerable heat is radiated from the upper surface of the block. Therefore the molten glass immediately in contact with the sides of the passage are chilled to a lower temperature than the glass in the center of the passage being drawn upwardly and this difference of temperature causes waves or streaks to form in the surface of the glass. This conduction of heat and radiation by the drawing block is particularly apparent where cooling chambers similar to 14 are utilized.

With the form of drawing block as shown in Figs. 1 and 2, I utilize a layer of heat insulating material 15 which may be asbestos on each side of the orifice in the recess 7. This layer has a material effect in preventing the conduction and radiation of the heat from the refractory material of the drawing block and hence maintains its temperature at a higher degree, causing less difference of temperature of the glass immediately adjacent the body and that in the center of the passage forming the main body of the drawing sheet. I attribute to this layer or coating of insulating material, the great reduction or elimination in the waves, lines or other imperfections on the surface of the sheet glass drawn through a drawing block as above described. It is to be understood that the glass being drawn may be subject to drawing rolls or the like positioned above the drawing block.

In the construction of Fig. 4 the drawing block is very much the same shape as shown in Figs. 1 and 2. However, in this case, slight beads 16 are formed at the edge of the discharge or drawing orifice of the glass passage and the heat insulating coverings 15 fit between such beads and the rims 8 of the block. The functions performed are substantially the same.

In the construction shown in Figs. 5 and 6, I incorporate a heat insulating material 17 in the body of the drawing block imbedded directly in the refractory material of which the block is made. In this case the heat insulating layer is shown as L-shaped having one side 18 adjacent the bottom of the recess and a vertical side 19 adjacent the walls of the passage near the discharge orifice. In some types of drawing blocks it is more satisfactory to imbed the heat insulating material directly in the body of the block than to coat it on the outside as shown in Figs. 1 to 4.

In Figs. 7 and 8, I illustrate a drawing block particularly adapted for drawing rods; such block may be designated as a circular block having a recess 21 with the molten glass passage 22 therein. The recess forms a shelf 23 on which is a flat ring 24 of heat insulating material. I also sometimes in addition use an additional ring 25 on the upper rim 26 of the block; the glass being drawn through the drawing block of Figs. 7 and 8 is manipulated much the same as described above. My method may also be used for drawing or blowing cylinders.

From the above description, although indicated as being applied to the drawing of sheet glass and rods, it will be apparent that my method and appliances may be adapted to drawing various shapes and designs of glass. One of the essential features of my invention comprises the reduction or elimination of the conduction and radiation of heat from the refractory drawing block bodies or other bodies with which the molten glass comes in contact in leaving the glass tank or pot and solidifying so as to reduce or eliminate differences of temperature between the inside of the article being drawn and the surface thereof at the drawing block.

The insulation indicated by the elements 15, 17 and 24 may be asbestos which I find satisfactory for this purpose, or other insulating material may be utilized. Asbestos has, and any material utilized should have better heat insulating properties than the clay block through which the glass is drawn.

Although my invention as to its method and the appliances is basically simple, nevertheless the method and appliances may be changed to adapt them to different types of glass drawing, without departing from the spirit of my invention as set forth in the description, drawings and claims.

Having thus described my invention, what I claim is:

1. A method of drawing glass comprising drawing glass in contact with a refractory body and heat insulating said body to prevent conduction and radiation of heat therefrom.

2. In the method of drawing glass in contact with a refractory body, reducing or preventing the conduction and radiation of heat from said body by heat insulation.

3. In the method of drawing glass through a drawing block, the step of heat insulating to reduce or prevent the radiation and conduction of heat from said block.

4. In the method of drawing glass through a drawing block, the step of heat insulating to prevent or reduce the heat radiated and conducted upwardly from said drawing block.

5. In the method of drawing glass upwardly through a passage in the drawing block, comprising heat insulating to reduce or prevent the conduction and radiation of heat from the upper side of the block adjacent the glass being drawn.

6. In the method of drawing glass in which glass is drawn in contact with a refractory material, preventing the conduction of heat in said refractory material by incorporating a poor conductor of heat therein.

7. In the method of drawing glass in contact with refractory material, comprising reducing the heat conduction through the refractory material by incorporating a poor conductor of heat in the path of the conducted heat and preventing radiation of heat from the refractory material by heat insulating and exposed radiating surface.

8. In an apparatus for drawing glass having a body with which the glass contacts, a poor conductor of heat to reduce the heat conducted by and radiated from said body.

9. In an apparatus for drawing glass having a body of refractory material against which the glass contacts in drawing, a heat insulating material for said body to reduce the conduction and radiation of heat.

10. An apparatus for drawing glass comprising a drawing block of refractory material, said block having a surface against which the glass contacts and a heat insulating material adjacent the said surface adapted to reduce heat radiated from the block.

11. In an apparatus for drawing glass, a drawing block having a passage therethrough for molten glass, and a heat insulating material adjacent the said passage.

12. A drawing block for drawing glass, having a passage therethrough, and heat insulating material incorporated in said drawing block adapted to prevent conduction and radiation of heat therefrom adjacent the passage.

13. A drawing block for drawing glass, formed of refractory material, having a recess and a passage for the glass leading into said recess and heat insulating material in the recess adjacent the passage.

14. A drawing block for drawing glass, formed of refractory material, having a recess in its upper surface with a passage therein for molten glass, and a heat insulating covering in said recess adapted to prevent conduction and radiation of heat upwardly from the block.

15. In the method of drawing glass through a drawing block, the step of heat insulating to reduce or prevent the radiation of heat from said block.

16. In the method of drawing glass through a drawing block, the step of heat insulating to reduce or prevent the conduction of heat from said block.

In testimony whereof I have signed my name to this specification.

H. C. METZGAR.